INVENTORS
Raymond L. Southern &
Lyman D. Taylor.
BY James N. Ely
ATTORNEY

May 4, 1954  R. L. SOUTHERN ET AL  2,677,710
FURNACE STRUCTURE
Filed Dec. 26, 1952  4 Sheets-Sheet 4
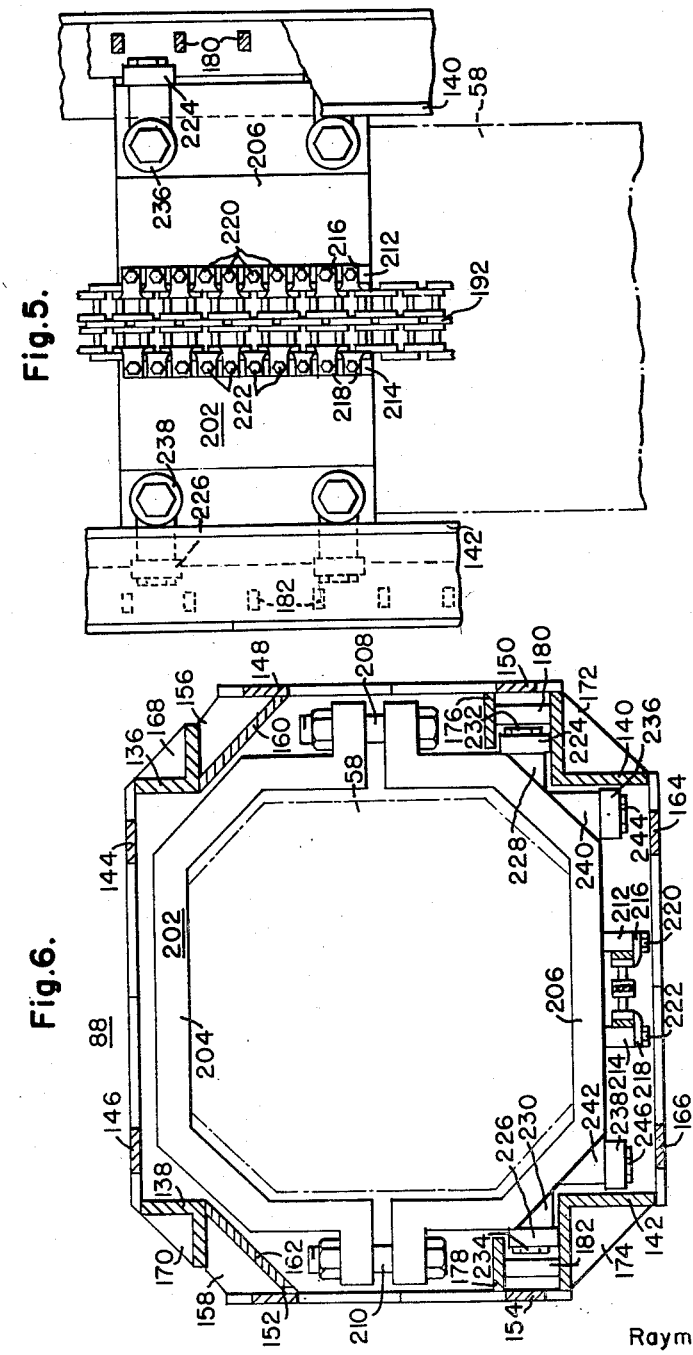
INVENTORS
Raymond L. Southern &
Lyman D. Taylor.
BY James N. Ely
ATTORNEY Patented May 4, 1954

2,677,710

UNITED STATES PATENT OFFICE 2,677,710

FURNACE STRUCTURE

Raymond L. Southern, Henderson, Nev., and Lyman D. Taylor, Troy, N. Y., assignors to Allegheny Ludlum Steel Corporation, Brackenridge, Pa., a corporation of Pennsylvania Application December 26, 1952, Serial No. 327,982

9 Claims. (Cl. 13—14)

This invention relates to furnaces and in particular to furnace structure for use in conjunction with the melting of consumable electrodes.

Recent developments in the titanium metal field have made possible the production of commercially desirable titanium and titanium base alloys. However, the melting facilities for commercially producing such desirable metal have proven to be entirely inadequate for the high production of alloys of commercial quality. A recent advance in such production practices has been to melt consumable electrodes of sponge titanium or scrap titanium metal and/or alloy to form ingots of the metal.

It has been difficult heretofore to produce large ingots of titanium metal where consumable electrodes are employed because the furnace facilities available have been inadequate to handle large electrodes weighing in the order of several hundred pounds. Where attempts have been made to form the large ingot by using a multiplicity of small consumable electrodes fed and melted in sequence, it has been found that the resulting ingot is usually contaminated. On the other hand, where attempts have been made to use large electrodes, the weight of the electrode is so great that difficulty has been encountered in loading the electrode into the furnace, the electrode often breaking under its own weight when held unsupported in a horizontal position.

An object of this invention is to provide a furnace structure for facilitating the loading and melting of large consumable electrodes.

Another object of this invention is to provide a tiltable furnace structure having means therein for supporting an electrode as it is loaded into the furnace.

A further object of this invention is to provide a tiltable furnace structure having an endless chain disposed for operation therein provided with a clamping means for holding and supporting an electrode in operative relation with respect to a crucible in which the electrode is to be melted.

A more specific object of this invention is the provision in a tiltable furnace structure of an endless chain provided with an electrode clamping member and having pads thereon for supporting the electrode as the electrode is loaded into the furnace and a means for guiding the clamping member for a movement in a predetermined path in response to movement of the endless chain.

Other objects of this invention will become apparent from the following description when taken in conjunction with the accompanying drawings in which:

Fig. 5 is a detailed plan view, greatly enlarged, illustrating the mounting of a clamping member on an endless chain as used in the structure of Fig. 1, and Fig. 6 is a plan view, greatly enlarged, of a portion of the structure of Fig. 1 taken along the line VI—VI thereof.

Figure 1:
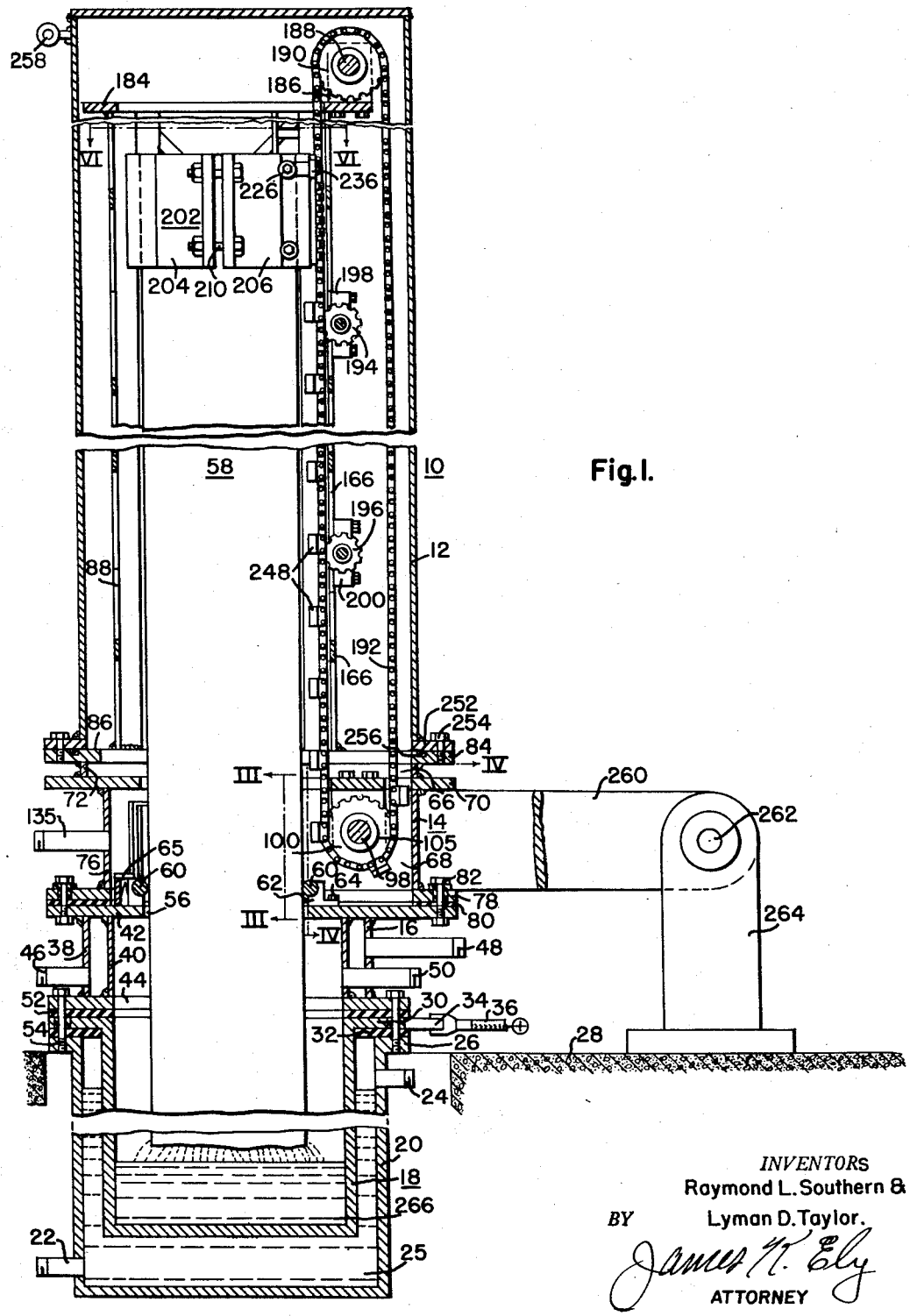
Figure 1 is a view in elevation and partly in section of a furnace structure embodying the teachings of this invention.

Referring to the drawing and in particular to Fig. 1 thereof, this invention is illustrated by reference to a furnace structure shown generally at 10. The furnace structure 10 comprises an upper section 12, an intermediate portion 14, and an insulating jacket or portion 16, all of which when assembled is disposed to be seated in aligned relation with a crucible 18 which is disposed in a water jacket 20. The structures of the crucible 18 and water jacket 20 are well-known, the crucible usually being formed of copper or another highly conductive metal, while the water jacket 20 disposed about the crucible 18 is provided with an inlet 22 and an outlet 24 for supplying a flow of cooling water 25 about the crucible 18.

The water jacket 20 is usually disposed in a pit so that the rim member 26 of the water jacket is at the level of the floor or other suitable foundation 28. As illustrated, the crucible 18 is also provided with a rim member 30 disposed to seat on the rim member 26 of the water jacket 20, a gasket 32 of dielectric material being disposed between the rims 26 and 30 for providing a tight seal therebetween. In practice the rim 30 of the crucible 18 is provided with a terminal lug 34 which is disposed to be connected as by means of a cable 36 to a terminal of positive polarity of a suitable source (not shown) of direct current power supply.

The insulating jacket 16 is formed of a pair of spaced wall members 38 and 40 disposed between an upper plate rim member 42 and a lower plate rim member 44. As illustrated, the insulating jacket or portion 16 is provided with a suitable inlet 46 and an outlet 48 for circulating cooling water in the space formed between the wall members 38 and 40. An outlet pipe 50 is also disposed to extend through both of the wall members 38 and 40 into the cavity formed by the inner wall member 40 for the purpose of providing for the escape of the atmosphere within the furnace structure as will be explained more fully hereinafter. The lower rim member 44 of the insulating portion 16 is of a size to seat on the rim member 36 of the crucible 13, a gasket 52 of dielectric material being normally disposed between the rim members 44 and 36 for providing a tight leak-proof joint therebetween when the insulating portion 16 is assembled on the crucible 18 and secured thereto as by means of spaced insulated bolts 54. As illustrated, the upper rim plate member 42 is provided with an opening 56 of a size suitable to accommodate an electrode 58 which is to be disposed in the furnace structure 10 as will be described hereinafter, the plate rim member 42 being provided with roller members 60 disposed about the periphery of a rectangular opening therein, one of the rollers 60 along one edge of the opening 56 thereof being disposed to be engaged by a surface of the electrode 58 under loading conditions. Each of the rollers 60 is preferably supported in spaced bearing blocks 62 which are secured to the upper surface of the plate rim member 42 in any suitable manner, an embodiment being hereinafter described.

The intermediate portion 14 is formed of two sections 66 and 68 having a common plate rim member 70 between the vertical side wall members 72 and 76, respectively. The side wall member 76 is provided with a lower rim member 78 disposed to seat on the plate rim member 42 of the insulating portion 16, a gasket 80 being disposed therebetween for providing a leak-proof joint therebetween when the rim members 78 and 42 are secured as by means of spaced bolts 82. Likewise the wall member 72 of the upper section 66 is provided with an upper plate rim member 84 which is of a size to extend across the wall member 72 to provide a ledge 86 extending inwardly thereof for supporting a substantially rectangular structural frame member 88 as will be described more fully hereinafter, the frame member 88 being preferably welded thereto.

Figure 3:
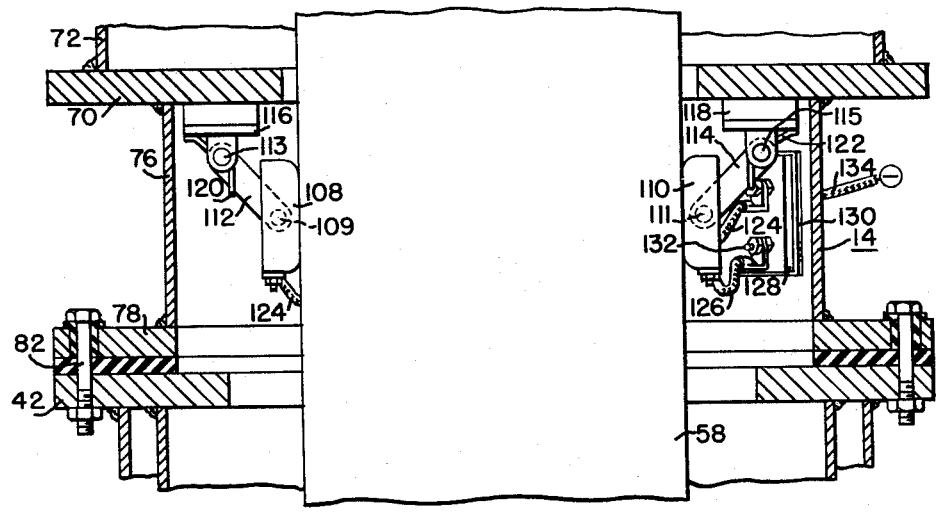
Fig. 3 is a view in section and greatly enlarged of a portion of the structure of Fig. 1 as taken along the line III—III thereof.
Figure 4:
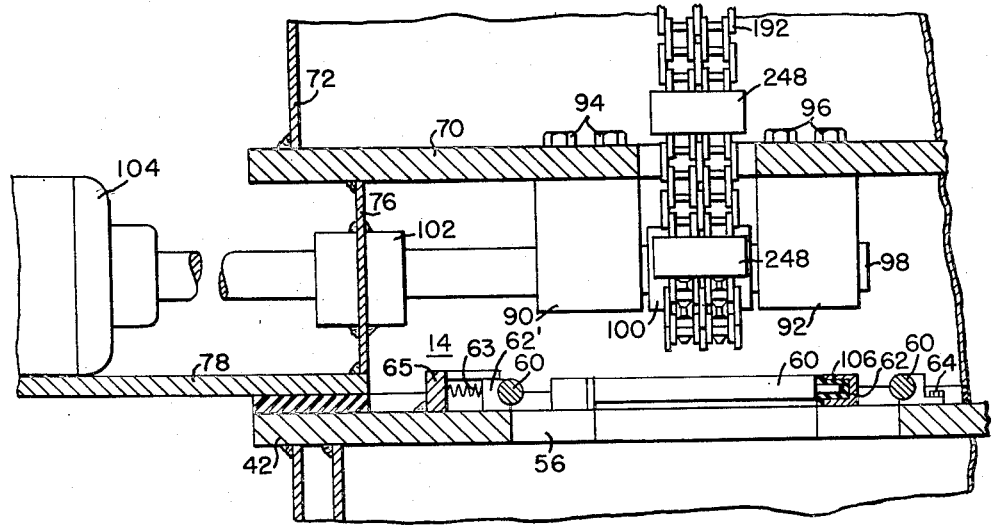
Fig. 4 is a view in section and greatly enlarged of another portion of the structure of Fig. 1 as taken along the line IV—IV thereof.

Referring to Figures 3 and 4, the internal structure of the intermediate section 14 is more clearly illustrated. Thus, the upper plate rim member 70 is illustrated in Fig. 4 as being provided with a pair of downward depending bearing housings 90 and 92 which are secured in spaced relation on the rim member 70 as by means of bolts 94 and 96, respectively. The bearing housings 90 and 92 are disposed to support a shaft 98 which carries a sprocket drive wheel 100 therebetween, the shaft 98 extending through a suitable gland seal 102 in the side wall 76 to be driven by a suitable drive 104 which is carried on the upper surface of the lower rim member 78, such rim member 78 having an extension along one side which will function as a platform or support for the drive unit 104. The details of the mounting of the rollers 60 are also more clearly illustrated in Fig. 4, each of the rollers 60 preferably being of steel and being mounted in bearings 106 preferably formed of an insulating fibrous material impregnated with a condensation resin.

In the embodiment illustrated in Fig. 4, a pair of the adjacent rollers 60 are provided with fixed bearing blocks 62 which are rigidly secured to the upper surface of the plate rim member 42 by means of bolts 64. The pair of rollers 60 mounted diametrically opposite the pair of fixed rollers are provided with slideably mounted bearing blocks 62' so biased by springs 63 and assembled in a holding member 65 as to permit transverse movement thereof to insure the positioning of the rollers 60 diametrically opposite the pair of fixed rollers 60 to engage the electrode 58 whereby the four rollers 60 engage the four sides of the electrode 58. The rollers 60 about the opening 56 thus cooperate in guiding the electrode 58 when the furnace structure 10 is in the vertical position illustrated in Fig. 1.

The intermediate portion 14 is also provided with a pair of sliding electrical contact members 108 and 110 for engaging opposite surfaces of the electrode 58 as more clearly illustrated in Fig. 3. Thus, the sliding electrical contact members 108 and 110 are pivotally mounted as at 109 and 111, respectively, on arms 112 and 114, respectively, which are pivotally secured as at 113 and 115, respectively, to suitable brackets 116 and 118, respectively, carried by the under surface of the rim member 70. The pivotally mounted contact members 108 and 110 are disposed to be biased into engagement with the electrode 58 as by means of spring members 120 and 122, respectively, the contact members being electrically connected as by means of conductors 124 and 126, respectively, to a terminal block 128 carried on the inner surface of the wall member 76 of such portion. The terminal block 128 is preferably of conducting material being insulated from the wall member 76 as by means of a sheet 130 of suitable insulating material, one of the studs 132 extending through the side wall member 76 and being suitably insulated therefrom as by an insulating bushing (not shown) to be connected by a cable 134 to a terminal of negative polarity of the source (not shown) of the direct current source of power supply. A gas inlet 135, illustrated in Fig. 1, is provided for admitting a suitable gas to the furnace structure as will be referred to hereinafter.

Figure 2:
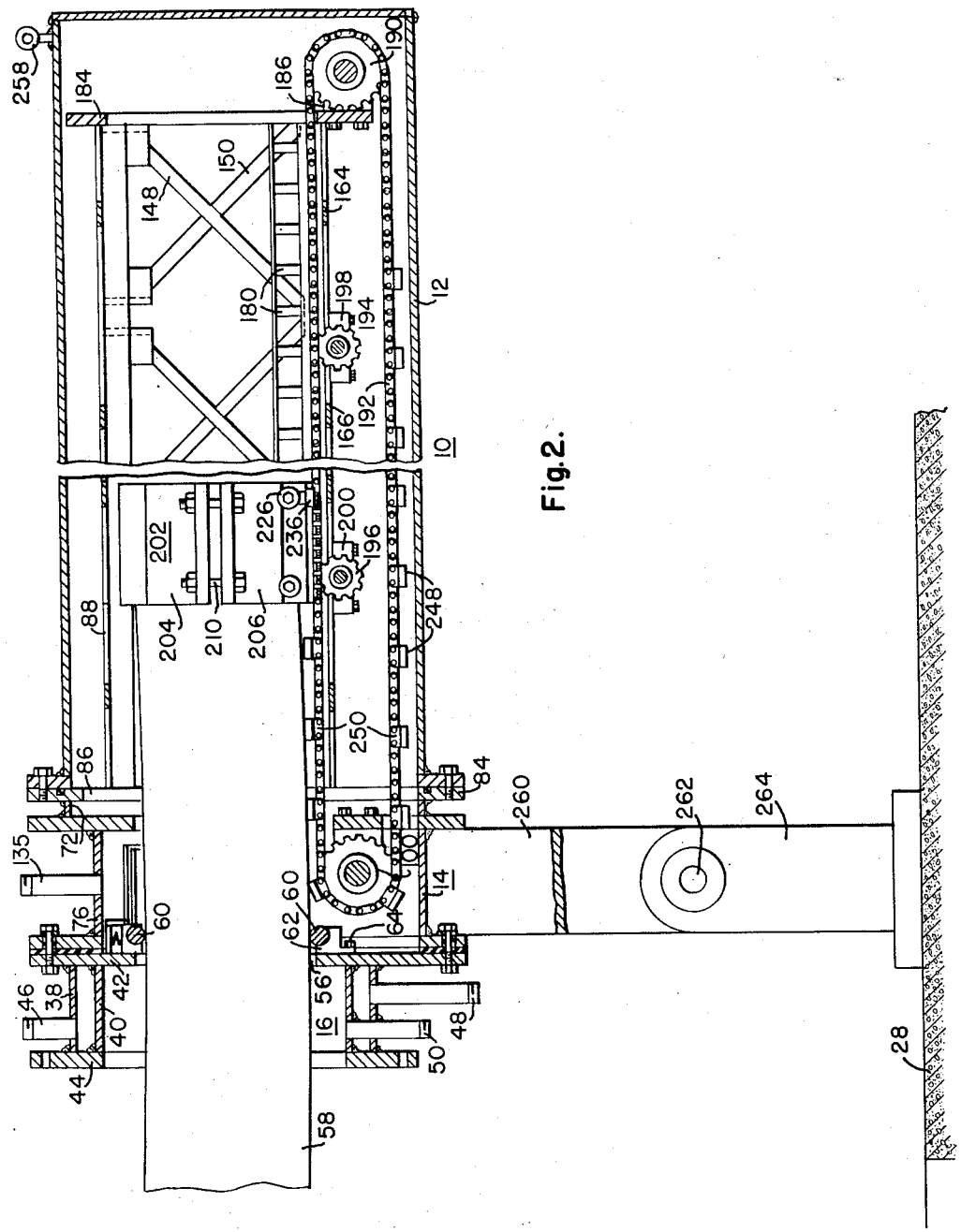
Fig. 2 is a view in elevation and partly in section of the structure of Fig. 1 illustrating the structure as tilted.

The substantially rectangular structural frame 88 referred to hereinbefore as being welded to and supported by the ledge 86 of the rim 84 is more clearly illustrated in Figs. 2 and 6 of the drawings. Thus, as illustrated in Fig. 6 the frame member comprises four vertical angle members 136, 138, 140, and 142 disposed in spaced relation with each other to define the vertically extending corners of the frame 88. The angle members 136 and 138 are connected by a series of cross braces 144 and 146 which extend diagonally between the edges of the angle members 136 and 138 and are preferably secured thereto as by means of welding. The other edges of the angle members 136 and 138 are connected to adjacent edges of the angle members 140 and 142, respectively, by means of cross braces 148—150 and 152—154, respectively, it being noted that such cross braces are secured to flange plates 156 and 158, respectively, which in turn are secured to the angle members 136 and 138, respectively, a plurality of diagonal braces 160 and 162, respectively, being disposed to extend along the edge of the flange plates 156 and 158, respectively, between the angle members 136 and 138, respectively, and the associated cross braces 148—150 and 152—154, respectively. The diagonal braces and the associated flange plates, angle members and cross braces are all welded together to provide a strong structure. The other edges of the angle members 140 and 142 are secured together and supported as by means of cross braces 164 and 166 in the same manner that cross braces 144 and 146 secure the edges of the angle members 136 and 138. Spaced flange members 168, 170, 172, and 174 are also associated with and welded to the angle members 136, 138, 140, and 142, respectively, to reinforce such angle members.

In order to provide a guide means, as will be referred to hereinafter, vertical straps 176 and 178 are disposed in the frame member 88 in spaced relation and parallel to one of the sides of the angle members 140 and 142, respectively. The vertical straps are maintained in spaced relation by means of spacer members 180 and 182, respectively, a plurality of such spacer members being disposed in spaced aligned relation between and welded to their associated vertical straps and the associated angle members. The straps 176 and 178 are disposed to seat against their associated cross braces 148—150 and 152—154, respectively, being preferably welded in assembled relation therewith.

As more clearly illustrated in Figs. 1 and 2, the substantially rectangular structural frame member 88 is provided with an upper rim plate member 184 which is disposed to carry and support a pair of spaced bearing housings 186, only one of which is illustrated, similar to the bearing housings 90 and 92, the bearing housings 186 being disposed to support a shaft 188 upon which a sprocket wheel 190 is mounted. When assembled, the sprocket wheel 190 is in alignment with the sprocket drive wheel 100 carried in the intermediate portion 14. An endless chain 192 is disposed about the sprocket wheels 100 and 190 for movement in response to operation of the drive unit 104 to drive the shaft 98. In order to support the stretch of the endless chain 192 to maintain it in an operative position, idler sprocket wheels 194 and 196 are mounted in suitable bearing housings 198 and 200, respectively, which are secured as by welding or bolting the bearing housings to the cross braces 164 and 166 of the frame member 88. The idler sprocket wheels 194 and 196 are preferably disposed in spaced relation and while only two of such sprocket wheels are illustrated, it will be understood that any number thereof may be employed for the purpose of supporting the stretch of the endless chain 192.

In order to hold an end of the electrode 58 to thereby control movement thereof, a split clamping member 202 is disposed to be carried by the endless chain 192. The details of the split clamping member 202 are more clearly illustrated in Figs. 5 and 6 of the drawings, such clamping member comprising two half sections 204 and 206 disposed to be secured together by means of bolts 208 and 210 which extend through flanges carried by the ends of the half sections 204 and 206. The half sections 204 and 206 are preferably of a shape so that when secured together the clamping member 202 is preferably of an octagon shape for engaging at least two sides of an electrode member 58 when seated thereon in clamping engagement therewith. The half section 206 of the clamping member is provided with two spaced lugs 212 and 214 extending along one side thereof. The lugs 212 and 214 are preferably spaced apart a distance substantially equal to the width of the endless chain 192 so that when the endless chain is disposed between such lugs, there is a tight fit therebetween.

In order to secure the lugs 212 and 214 to the endless chain 192 and thereby provide for supporting the clamping member 202, the endless chain is preferably formed with certain of the links thereof having outwardly extending flanges 216 and 218 as clearly illustrated in Figs. 5 and 6 so that when the chain 192 is disposed between the lugs 212 and 214, the lugs 216 and 218, respectively, will seat thereon and can be secured thereto as by means of the set screws or bolts 220 and 222, respectively. The half section 206 of the clamp 202 is thus secured to the endless chain 192 and is disposed for movement in response to operation of the endless chain 192.

In order to guide the clamping member 202 so as to limit sideways movement thereof and provide for only a predetermined path of movement for the clamping member within the frame 88, the half section 206 of the clamping member 202 is provided with two pairs of spaced opposed roller members 224 and 226 (see Figs. 5 and 6) disposed to seat within the space formed between the vertical straps 176 and 178, respectively, and their associated angle members 140 and 142, respectively. The rollers 224 and 226 are preferably mounted on lugs 228 and 230, respectively, carried by the half section 206 of the clamping member being secured thereto by setscrews 232 and 234, respectively, the shaft of the setscrews forming bearings for the roller members 224 and 226 whereas the heads of the setscrews serve to retain the roller members in position. The roller members 224 and 226 are of a size to have only a small clearance between the associated vertical straps and angle members so that very little sideways movement of the roller members 224 and 226 therebetween is permitted to limit corresponding sideways movement of the clamping member 202. By employing two sets of the rollers 224 and 226 as shown in Fig. 5, the effect of torque by reason of the weight of the off-center support of the electrode under operating conditions will be overcome.

The half section 206 is also provided with a pair of roller members 236 and 238 similarly mounted on lugs 240 and 242, respectively, by means of the setscrews 244 and 246, respectively. The roller members 236 and 238 are disposed closely adjacent to a surface of associated angle members 140 and 142, respectively, to limit sideways movement of the clamping member 202 in a direction between the angle members 140 and 142. Thus, it is apparent that the roller members 224 and 226 limit sideways movement of the clamping member 202 in one direction, whereas roller members 236 and 238 limit the sideways movement of the clamping member 202 in the opposite direction. By thus limiting sideways movement of the clamping member 202, a predetermined path of movement of the clamping member 202 is obtained in response to a movement of the endless chain 192 and the endless chain 192 is guided so as to always be engaged by the sprocket wheels which support and guide the endless chain.

As illustrated in Figs. 1, 2, and 4, the endless chain 192 is also provided with a plurality of spaced pad members 248 which extend across the face of the endless chain and is provided with side flange members 250 which are disposed to be secured to the sides of the links of the endless chain 192. The pad members 248 are preferably of metal for resisting abrasion as will be understood more clearly hereinafter and are of a size to project outwardly from the endless chain 192 to engage a surface of the electrode 58 under loading conditions.

In order to provide a cover for the frame member 88 and the drive mechanism, the upper section 12 is provided, being of a size to seat over the elongated frame member 88 and the endless chain drive 192 for the clamping member 202. The upper section 12 is preferably a sealed cylindrical container being provided with a lower rim member 252 disposed to seat on the upper rim member 84 of the intermediate portion 14 and to be secured thereto as by means of spaced bolts 254, a suitable gasket material 256 being disposed therebetween in a groove formed in the rim member 84 for providing a sealed joint therebetween. The upper section 12 is also preferably provided with an eyebolt 258 adjacent its upper end for facilitating pivotal movement of the furnace structure under certain operating conditions.

In order to provide for tilting of the upper section 12 of the furnace structure, either with or without the insulating portion 16 secured thereto, the intermediate section 14 is provided with a yoke member 260 which may be secured thereto in any suitable manner, the end of the yoke member 260 being pivotally mounted as at 262 on a pedestal 264 which is seated on and secured to the foundation 26. Thus, the furnace structure can be tilted from the vertical position illustrated in Fig. 1 to a horizontal position such as is illustrated in Fig. 2 of the drawings.

In operation, where it is desired to load a consumable electrode 58 into the furnace structure 12, the bolts 54 or the bolts 32 are first removed depending upon whether or not it is desired to move the insulating portion 16 as a part of the furnace structure. In the embodiment illustrated in Fig. 2, the insulating portion 16 is retained in its assembled position with respect to the intermediate section 14. Thereafter a suitable hoist (not shown) is secured to the eyebolt 258 and the furnace structure is tilted about its pivot 262 to the horizontal position illustrated in Fig. 2.

In order to load the electrode 58 into the furnace structure, the upper housing section 12 is preferably removed from its assembled position on the intermediate section 14 by removing the bolts 254 to expose the frame member 88 and the clamping member 202 carried by the endless chain 192. The clamping member 202 is then actuated by operating the sprocket drive wheel 190 to a position closely adjacent the common rim member 70 of the intermediate section 14. With the clamping member 202 in this position, the bolts 208 and 210 are loosened so that the half portions of the clamping member 202 can be spread somewhat to receive an end of the electrode 58 as the electrode is lifted and admitted to the lower portion of the furnace structure. Where the insulating portion 16 is retained as an integral part of the tilted furnace structure, the end of the electrode is seated on one of the fixed rollers 60 and is then manually moved to a position where the end of the electrode is placed between the half portions of the clamping member 202. The bolts 208 and 210 are then tightened to secure the end of the electrode in the clamping member 202 and the drive unit 104 is operated to drive the sprocket wheel 190 to move the clamping member 202 toward the right of the structure illustrated in Fig. 2. As the electrode 58 is moved through the intermediate portion 14 by such movement of the clamping member 202, the electrode 58 sags slightly under its own weight and the pads 248 are moved in response to the movement of the endless chain 192 into progressive engagement with the lower surface of the horizontally extending electrode 58 to thereby cooperate with the roller 60 to support the weight of the electrode 58 as the clamping member 202 is moved to a position closely adjacent to the upper plate rim member 184 of the frame member 88. In this position the electrode is usually within the confines of the tilted furnace structure. The upper housing portion 12 is then replaced in operative assembled position being secured in such position by the bolts 254.

After the electrode 58 is loaded into the furnace structure in the manner just described, the furnace structure is tilted from the horizontal position illustrated in Fig. 2 to the vertical position illustrated in Fig. 1 where the furnace structure is in alignment with and is secured in seated sealed relation with the crucible 18. The crucible 18 is usually provided with an initial supply 266 of metal which is to form a component of the ingot to be melted so that as the electrode 58 is lowered into arcing engagement with the initial supply 266 of metal to be melted, an arc will readily be formed between the electrode 58 and the initial supply 266. In tilting the furnace structure from the horizontal to the vertical position, it is to be noted that the weight of the electrode 58 is supported by only the clamping member 202 carried by the endless chain 192 when the structure is in the vertical position. This is evident for the clamping member 202 in effect forms an off-center support for the electrode 58 and the weight of the electrode causes the electrode to swing, as the structure moves to the vertical position, from an engaging position with respect to the pads 248 to a position where the electrode 58 is free from engaging the pads and is supported by only the clamping member 202 in a position substantially central with respect to the crucible 18 whereby arcing between the electrode 58 and the side walls of the crucible 18 will be prevented.

After the furnace structure is positioned and sealed in the vertical position illustrated in Fig. 1 and the water jacket 20 and insulating jacket 16 are connected to a supply of cooling water, a gas, such as argon or helium, which is non-contaminating to titanium metal is admitted to the sealed furnace structure through the inlet 135 provided in the intermediate portion 14 to flush the entire sealed container, the flushing gas escaping through the outlet 50. When the furnace structure is satisfactorily purged, the cables 36 and 134 are energized and the electrode 58 is lowered as by operating the driving unit 104 to effect an operation of the endless chain 192 to lower the clamping member 202 and electrode 58 carried thereby to a position where an arc is established between the lower end of the electrode 58 and the initial supply 266 of metal in the crucible 18. The non-contaminating gas is preferably supplied to the furnace structure throughout the melting operation. The driving unit 104 is preferably controlled in response to either the arc current or the arc voltage of the arc so as to maintain a substantially constant melting of the electrode 58, such controls being well-known to the electrical art. As is evident during such downward movement of the electrode 58 during the melting cycle thereof, sideways movement is substantially prevented by reason of the guide rollers carried by the clamping member 202 which cooperate with the frame member 38 and the spaced rollers 60 to prevent any substantial sideways movement of the clamping member 202 and consequently the electrode 58 carried thereby. Continuous melting of the electrode 58 is maintained to produce a large ingot in the crucible 18 until the clamping member 202 is lowered to a position where it is closely adjacent the rim plate member 76 of the intermediate section 14.

When the electrode 58 is thus melted, the power supply to the electrode is interrupted and the driving unit 104 is energized to effect an operation of the endless chain 192 in a direction to raise the clamping member 202 to a position where the unmelted butt end of the electrode that is held in the clamping member 202 clears the crucible 18 or the insulating section 16 depending upon whether or not the insulating section is to be moved with the furnace structure about the pivot 262. The furnace structure is preferably maintained in its operative position with respect to the crucible until after solidification of the ingot thus formed in the crucible 18. Thereafter the supply of non-contaminating gas and cooling water to the furnace structure is interrupted and the furnace structure is then tilted to the horizontal position described hereinbefore where the upper housing section 12 can be removed therefrom and the butt end of the electrode can be removed from the clamping member 202.

The apparatus of this invention facilitates the loading and melting of large consumable electrodes weighing several hundred pounds without encountering breakage of such electrodes during the loading of the furnace structure. A simple guide mechanism is provided for insuring the proper positioning of the electrode for the efficient melting thereof without encountering arcing between the electrode and the side walls of the crucible in which the ingot is formed. Further, the furnace structure is formed of standard components and can be readily reproduced by anyone skilled in the art.

We claim:

1. In a furnace structure for use in melting a consumable electrode in a crucible, the combination comprising, a housing disposed to be tilted between a horizontal position for admitting the electrode thereto and a vertical position in aligned seating relation with the crucible for feeding the electrode thereto, an endless chain disposed for lengthwise movement in the housing, means carried by the chain for receiving and holding an end of the electrode and effecting movement of the electrode in response to movement of the chain, and a plurality of pads carried by the chain in spaced relation to one another, the pads being disposed to progressively engage a surface of the electrode as the electrode is moved into the housing to support the electrode during such movement.

2. In a furnace structure for use in melting a consumable electrode in a crucible, the combination comprising, a housing disposed to be tilted between a horizontal position for admitting the electrode thereto and a vertical position in aligned seating relation with the crucible for feeding the electrode thereto, an endless chain disposed for lengthwise movement in the housing, means carried by the chain disposed to receive and hold an end of the electrode for effecting movement thereof in response to movement of the chain, a plurality of pads carried by the chain in spaced relation to one another, the pads being disposed to progressively engage a surface of the electrode as the electrode is moved into the housing to support the electrode during such movement, and means disposed to support the chain to maintain the pads in said progressive supporting engagement with the surface of the electrode while the housing is in the horizontal tilted position.

3. In a furnace structure for use in melting a consumable electrode in a crucible, the combination comprising, a housing disposed to be tilted between a horizontal position for admitting the electrode thereto and a vertical position in aligned seating relation with the crucible for feeding the electrode thereto, an endless chain disposed for lengthwise movement in the housing, means carried by the chain for receiving and holding an end of the electrode and effecting movement of the electrode in response to movement of the chain, guide means disposed within the housing for cooperating with the holding means to limit the path of movement thereof to a predetermined path in response to the movement of the chain, and a plurality of pads carried by the chain in spaced relation to one another, the pads being disposed to progressively engage a surface of the electrode as the electrode is moved into the housing to support the electrode during such movement.

4. In a furnace structure for use in melting a consumable electrode in a crucible, the combination comprising, a housing disposed to be tilted between a vertical position with its lower end in seating relation with the crucible and a horizontal position for admitting the electrode thereto, an endless chain disposed for longitudinal movement in the housing, means carried by the chain disposed to receive and hold an end of the electrode as it is admitted to the housing for effecting movement thereof in response to movement of the chain, roller means carried by the housing adjacent the lower end thereof disposed to engage a surface of the electrode as it is admitted to the housing, and a plurality of pads carried by the chain in spaced relation to one another to progressively engage said surface of the electrode as the electrode is moved into the housing, the pads and roller means cooperating to support the electrode during its movement into the housing.

5. In a furnace structure for use in melting a consumable electrode in a crucible, the combination comprising, a housing disposed to be tilted between a vertical position with its lower end in seating relation with the crucible and a horizontal position for admitting the electrode thereto, an endless chain disposed for longitudinal movement in the housing, means carried by the chain disposed to receive and hold an end of the electrode as it is admitted to the housing for effecting movement thereof in response to movement of the chain, guide means disposed within the housing for cooperating with the holding means to provide a predetermined path of movement thereof in response to the movement of the chain, roller means carried by the housing adjacent the lower end thereof disposed to engage a surface of the electrode as it is admitted to the housing, and a plurality of pads carried by the chain in spaced relation to one another to progressively engage said surface of the electrode as the electrode is moved into the housing, the pads and roller means cooperating to support the electrode during the movement into the housing.

6. In a furnace structure for use in melting a consumable electrode in a crucible, the combination comprising, a housing disposed to be tilted between a horizontal position for admitting the electrode thereto and a vertical position in aligned seating relation with the crucible for feeding the electrode thereto, a structural frame disposed within the housing, an endless chain disposed for operation within the housing, the structural frame cooperating to support the chain for lengthwise movement in the housing, means carried by the chain for receiving and holding an end of the electrode and effecting movement thereof in response to movement of the chain, a plurality of pads carried by the chain in spaced relation to one another, the pads being disposed to progressively engage a surface of the electrode as the electrode is moved into the housing to support the electrode during such movement, and roller means carried by the electrode holding means disposed to cooperate with the structural frame to limit movement of the holding means to a predetermined path to thereby maintain the electrode in a substantially central position with respect to the crucible when the housing is in the vertical position.

7. In a furnace structure for use in melting a consumable electrode in a crucible, the combination comprising, a housing disposed to be tilted between a horizontal position for admitting the electrode thereto and a vertical position in aligned seating relation with the crucible for feeding the electrode thereto, an endless chain disposed in the housing for lengthwise movement therein, clamping means carried by the chain for receiving and holding an end of the electrode and effecting movement of the electrode in response to movement of the chain, a plurality of pads carried by the chain in spaced relation to one another, the pads being disposed to progressively engage a surface of the electrode as the electrode is moved into the housing to support the electrode during such movement, channel guide members disposed in opposed relation lengthwise of the housing, and roller members carried by the electrode clamping means disposed to seat in the opposed channel members and cooperate therewith to limit the movement of the clamping means to a predetermined path of movement to thereby maintain the electrode in a substantially central position with respect to the crucible when the housing is in the vertical position.

8. In a furnace structure for use in melting a consumable electrode in a crucible, the combination comprising a housing disposed to be tilted between a horizontal position for admitting the electrode thereto and a vertical position in aligned seating relation with the crucible for feeding the electrode thereto, a substantially rectangular structural frame disposed within the housing, an endless chain disposed for operation within the housing along one side thereof, means carried by the structural frame disposed to cooperate with the endless chain to support the chain in operative position, clamping means carried by the chain for receiving and holding an end of the electrode and effecting movement of the electrode in response to movement of the chain, a plurality of pads carried by the chain in spaced relation to one another, the pads being disposed to progressively engage a surface of the electrode as the electrode is moved into the housing to support the electrode during such movement, means carried by the clamping means disposed to engage the structural frame to cooperate therewith in limiting horizontal movement of the clamping means when the housing is in the vertical position and provide a predetermined vertical path of movement of the clamping means in response to movement of the chain, the electrode being free of the spaced pads when the housing is in the vertical position whereby the electrode is supported in operative relation with respect to the crucible by only the clamping means.

9. In a furnace structure for use in melting a consumable electrode in a crucible, the combination comprising, a housing disposed to be tilted between a horizontal position for admitting the electrode thereto and a vertical position in aligned seating relation with the crucible for feeding the electrode thereto, an endless chain disposed for lengthwise movement in the housing, means carried by the chain for receiving and holding an end of the electrode and effecting movement of the electrode in response to movement of the chain, and a plurality of pads carried by the chain in spaced relation to one another, the pads being disposed to progressively engage a surface of the electrode as the electrode is moved into the housing to support the electrode during such movement, the holding means being disposed to support the electrode in a substantially vertical position out of engagement with the pads when the housing is in a vertical position.

References Cited in the file of this patent

UNITED STATES PATENTS

| Number | Name | Date |
|---|---|---|
| 2,121,578 | Winter et al. | June 21, 1938 |
| 2,423,714 | Leonard | July 8, 1947 |
| 2,529,319 | Thys | Nov. 7, 1950 |
| 2,541,767 | Herres et al. | Feb. 3, 1951 |
| 2,640,860 | Herres | June 2, 1953 |